Patented Aug. 29, 1933

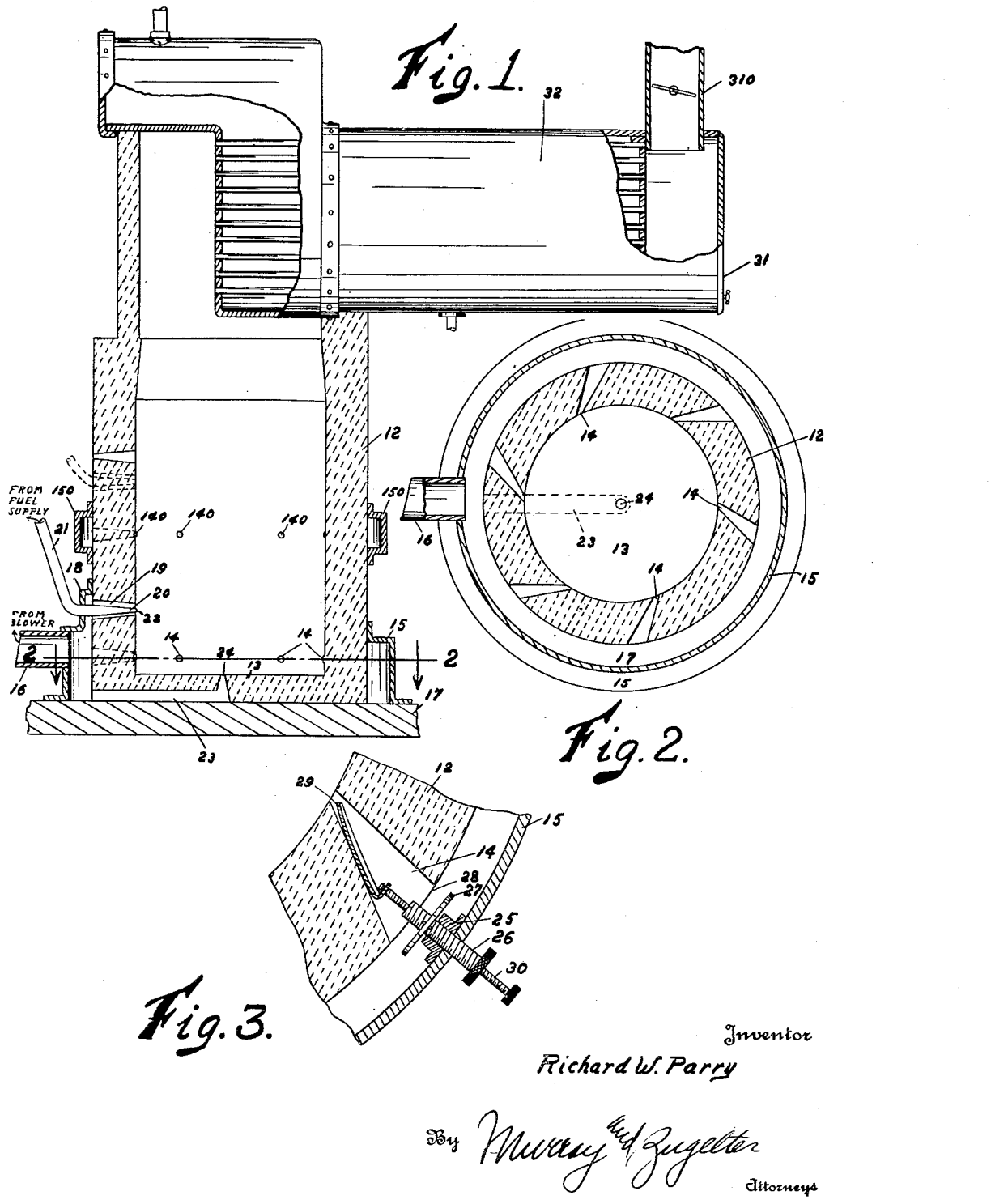

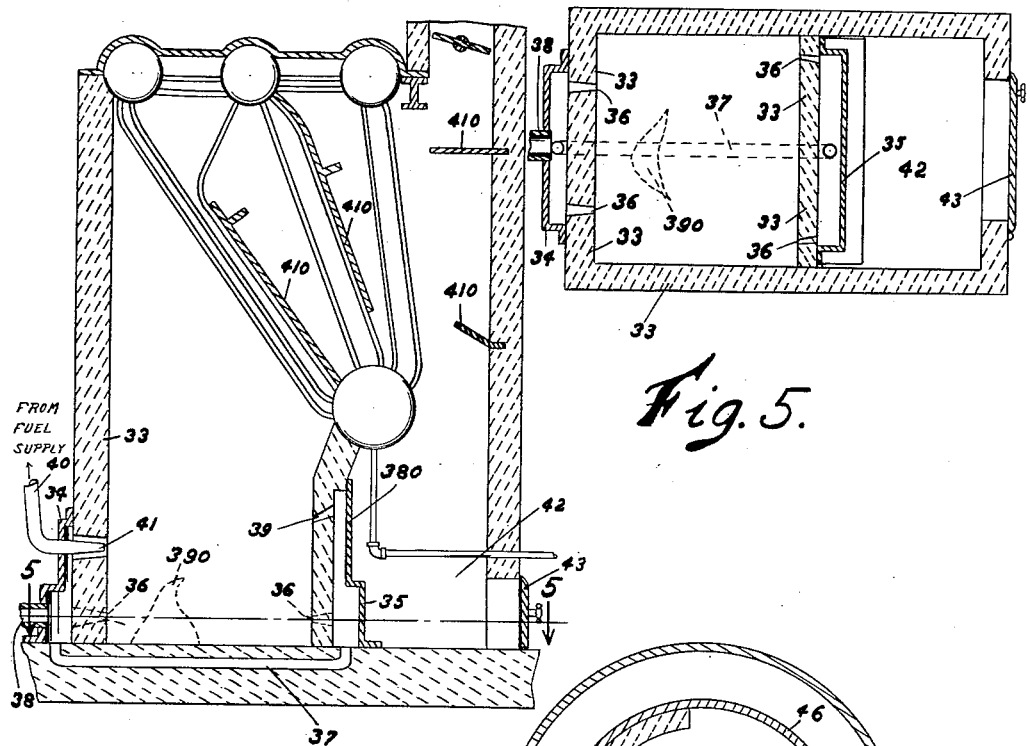
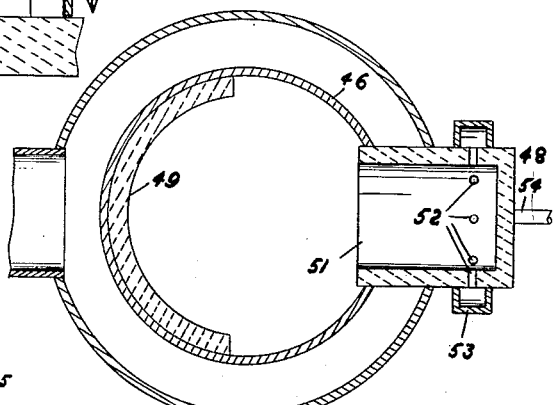
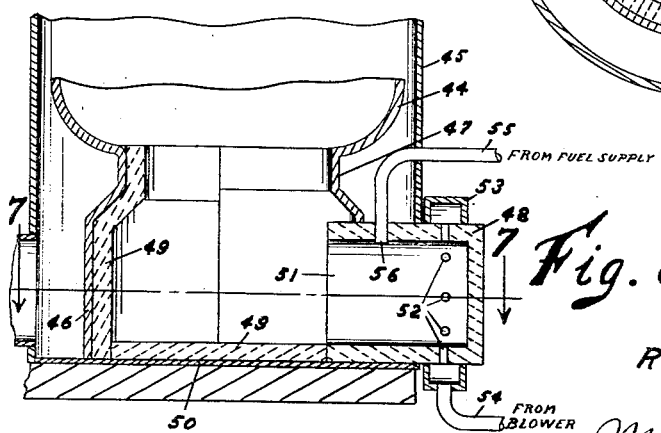

1,924,878

UNITED STATES PATENT OFFICE

1,924,878

METHOD AND APPARATUS FOR BURNING PULVERIZED FUEL

Richard W. Parry, Cincinnati, Ohio

Application September 3, 1929. Serial No. 389,946

5 Claims. (Cl. 110—28)

The present invention relates to a means and method for effecting combustion of powdered fuel and has for an object the provision of a method and means for carrying it out whereby the fuel is made to undergo such combustion as to permit of complete consumption of the combustible substances therein, and further to so conduct the combustion that the very small percentage of incombustible substance is rendered practically imperceptible.

Another object is to provide such a method and means as will practically eliminate the usual residual such as slag, clinker and ash in which combustibles are present.

Another object is to provide means which are readily adaptable to both industrial and domestic furnaces for carrying on this improved combustion of pulverized fuel.

Another object is to provide a means for handling the air of combustion in such a manner as to obtain optimum conditions for promoting and sustaining combustion of the fuel particles and at the same time reducing wear and tear on the plant to the end that exceptional efficiency and adaptability to ready control are made practicable.

Another object is to provide a method and apparatus for the purposes stated which requires only a simple and inexpensive furnace construction, but which may nevertheless be adapted to existing installations.

These and other objects are attained by the means and method herein described and disclosed in the accompanying drawings, in which:

Fig. 1 is a side elevational view, partly in cross-section, showing a typical installation of the device of the invention.

Fig. 2 is a view taken on line 2—2 of Fig. 1.

Fig. 3 is an enlarged fragmental view of an adjusting mechanism forming part of the device of the invention.

Fig. 4 is a cross-sectional elevational view showing the application of the invention to another type of industrial furnace.

Fig. 5 is a view taken on line 5—5 of Fig. 4.

Fig. 6 is a fragmental cross-sectional view of a domestic furnace equipped with the device of the invention.

Fig. 7 is a view taken on line 7—7 of Fig. 6.

It is known that the combustion of pulverized fuel requires air or oxygen at a proper temperature so that the finely divided particles of fuel may ignite and burn for liberating the desired heat.

Previously pursued methods and prior used apparatus have all attempted to mix pre-heated air with the proper quantity of powdered coal and to inject this mixture into the furnace or ignition chamber.

The essential distinction of the method and means of the present invention over previous practice lies in the fact that the fuel is introduced with a minimum of air and the air that is used is essentially a carrier to introduce the powdered fuel to the ignition chamber.

The present invention uses a minimum of air for injecting the pulverized fuel into the ignition chamber and this air may be cold or preheated as desired. The stream of fuel from the feed pipe and nozzle is denser because of the small quantity of carrier air. This feature is attended by many advantages which will be hereinafter more fully set forth. The majority of the air of combustion in the present device is introduced in a zone of the ignition chamber or furnace which is preferably below the level of the discharge end of the nozzle or relatively remote from the flue. The air of combustion or "secondary air" is furthermore introduced in jets at various angles so that each jet will sweep over a portion of the furnace wall so that the wall is cooled and the air is heated, and the jets are furthermore so arranged that violent turbulence is set up. The general plane in which the majority of this turbulence takes place is such that the natural draft of the furnace to the stack will induce only a gradual rise of this turbulent air. The powdered fuel is blown into the ignition chamber so that it may scatter and diffuse its particles into this heated turbulent air and the particles are carried about in the turbulent air without having any particular pre-determined velocity movement imparted to them. Therefore they are carried about freely in the turbulent air which by reason of its initial injection will never drive the particles against the furnace walls. In other words this secondary air is so introduced as to produce prolonged or violent turbulence or agitation and the pulverized fuel is introduced, diffused and carried about in this turbulent air for sufficient time and through a sufficient distance to enable complete combustion of each particle. The absence of any tendency to mixing of the particles furthermore precludes the formation of bodies of sufficient weight and size to acquire any set directional velocity movement.

Referring now to the drawings Fig. 1 shows an installation of the device of the invention to a well-type furnace. It is to be particularly noted that the wall 12 of the well or ignition chamber may be a single wall of fire brick or other suitable material although any of the complicated types of double or hollow wall may be employed if desired. The bottom 13 of the ignition chamber or well may also be of single thickness structure. The wall 12 has bores or openings 14 therein arranged to direct blasts or jets of air into a zone just above the floor of the bottom 13. Theoretically these openings 14 should be capable of similar arrangement and disposition in similar ignition chambers. Practical experience has proved that this is not a fact because numerous factors such as the location of the plant and perhaps other factors with which experts in the art are not thoroughly acquainted, will cause similar installations to operate with different degrees of efficiency. The arrangement shown in Figs. 1 and 2 is such that the jets of air directed through openings 14 will sweep across part of the face of wall 12 and impinge other jets of air to set up violent turbulence. Thus the radiant heat in the chamber is taken up, by this air and the walls are kept relatively cool so that the double hollow well casing is unnecessary and water cooled floor structure is superfluous. Air is supplied from any suitable fan or blower (not shown). A simple sheet metal ring casing 15 surrounds the bottom of the well and air under pressure from a suitable source is supplied thereto by way of pipe 16. As shown the casing 15 utilizes the wall of the well and the floor 17 to complete it, any suitable means being used to secure it in position and make it air tight.

The casing 15 may be supplied with a hollow upwardly disposed extension 18 to include the opening 19 into which the nozzle 20 of a fuel pipe 21 extends. This permits the nozzle to be made of ordinary sheet metal which is kept sufficiently cool by the envelope of moving air. This same enveloping and cooling air may serve to diffuse the powdered coal as it leaves the nozzle. The discharge end 22 of the nozzle may be of conical or flat fan shaped construction and is not for the purposes of this invention to be confused with a mixing or carbureting nozzle. The supply of pulverized fuel may be a storage bin having a connection with the pipe 21 or any of the several types of pulverizing mills may be employed in the usual manner to provide for conditioning the fuel as needed. The small quantity of air required to move the fuel through pipe 21 may be taken from the same source used for the casing 15 and pipe 16. It is found desirable to provide a conduit 23 in bottom 13 of the chamber so that an upwardly directed jet of air may be had by forming an opening 24.

Due to the unexplained peculiarities attending pulverized fuel combustion it is desirable to provide means to effect an initial adjustment of the relative velocity and direction of the air jets issuing from openings 14. An inexpensive and compact adjustment valve is shown in Fig. 3 and it contains independently actuated means to change the volume and velocity of the air and to effect nice adjustments of the angle of discharge thereof. As shown a fixed threaded boss is carried by the casing 15. A tubular member 26 is exteriorly threaded for engagement in the boss 25. Baffle or plate 27 fixed thereon may be moved toward and away from the larger outside end 28 of opening 14 to control the volume and rate of flow of the air. A vane or fin 29 shaped like a curved tapered scoop has a swivel connection with a threaded stud 30 which engages in the internal threads in tubular member 26. By turning the stud 30 the associated fin or vane is moved longitudinally in the tapered opening 14 with a consequent alteration of the direction of the blast issuing from the smaller end of said opening. The baffle 27 may be made to approach or recede from the larger end of the opening by manipulating the independently adjustable hollow stud 26. In this way both direction and velocity of the air jets or blasts are independently and individually effected so that the turbulence set up in that cross-sectional area or zone of the chamber is free from any uniform swirling. The body of turbulent air thus spends most of its force in creating violent agitation and turbulence and it is displaced by incoming and subsequently turbulent air and is subject to the stack draft instead of acting as a blast rushing toward the flue. Because of the sustained turbulence and agitation in a fuel free zone, the air takes up a great amount of the radiant heat in the chamber. One of these adjusting means is preferably mounted adjacent each of the jet openings 14 and at the test after installation they are individually adjusted until perfect combustion is found to result. These need never be touched after initial adjustment and the protruding portions may be cut off and soldered or brazed in position if this be deemed advisable.

It will be appreciated from the foregoing that while the jets of air from openings 14 perform the general function of first taking up the radiant heat and keeping the walls cool and then impinging the wall and one another to set up violent turbulence of this heated air, the proper turbulence results only from a series of jets whose settings and relative velocities are adjusted to the particular installation.

The arrangement described provides a violently agitated turbulent zone of heated air. The pulverized fuel is blown over and into this turbulence in a relatively gentle manner so that the particles separate widely and are individually carried about in suspension. Early ignition of the particles is thus promoted but the prolonged suspension in the turbulence assures complete combustion of each of these small bodies before the natural draft of the stack can draw it upward and out of the zone of combustion. As a result of this, ash in the usual sense of heavy deposit in the bottom of the chamber is absent. The actual incombustible portion of a given particle of powdered coal is imperceptible. In practice some of this fly-ash may accumulate behind the usual baffles of a boiler and may be removed by a suction hose. In the construction shown in Fig. 1, a door 31 below the stack 310 would be employed for cleaning out purposes.

All of the heat is liberated from the fuel under this highly efficient combustion and very little is lost because the turbulent air takes up the radiant heat during its movement in the chamber and over the walls.

It will be understood that the secondary air, i. e. the air coming in through pipe 16 may be taken from any convenient or desirable place; it may be drawn from the space immediately above the boiler 32 and below the ceiling above so that heat losses at that place may be reduced, and the air coming in through pipe 16 may be pre-heated.

There are two features of this invention which serve to eliminate most of the wear and tear on the equipment and furnace. The first is in the provision of the minimum of carrier air in the fuel supply pipe 21. There the stream of powdered fuel and enough air to move it moves through without the abrasive action that follows when a large volume of air and a relatively small amount of the fuel is forced through the pipes. Furthermore the particles of fuel are discharged from nozzle 22 at low velocity so that they are readily influenced by the turbulent air and hence do not have the objectionable action on the furnace wall in the line of the nozzle. The particles are thus prevented from impact on the walls and the formation of molten slag and clinkers is avoided.

The second feature of having the velocity of the secondary air directed over the walls before the particles of fuel are taken up by the air keeps the walls cool and obviously has no abrasive effect on them.

As indicated in dotted lines in Fig. 1, a deep well furnace may have a second series of openings 140, similar to openings 14, arranged at a distance above nozzle 22 but preferably discharging in a reverse direction so as to provide increased turbulence and more sustained suspension of the fuel from nozzle 22. Any means such as a blast ring or casing 150 may be used to supply the secondary air as suggested in the explanation of casing 15. Above this a second fuel nozzle (not shown) may be provided to supply fuel for a second combustion zone. In this way intense heats may be developed in a relatively small inexpensive furnace structure.

Figs. 4 and 5 illustrate the invention as applied to a rectangular furnace. The walls 33 may be of simple construction as heretofore explained. Just above the floor 34 a suitable casing or casings are provided to supply the secondary air for setting up the desired turbulence and for taking up the radiant heat and keeping the walls and floor cool. As shown casings 34 and 35 are extended along one pair of opposed walls and supply air to the openings 36. The casings may be connected by conduit 37 so that both may be fed by pipe 38 from a single blower, fan or compressor, (not shown). One or both of these casings may have hollow extensions 380 to supply additional blast openings such as 39 to direct other jets of air downwardly into those issuing from openings 36 to break up any tendency to a smooth uniform air movement, and in this way a violent turbulence may be assured. The same complete combusting is attained by feeding the powdered coal with a small amount of carrier air through fuel supply pipe 40 and nozzle 41 in practically the same manner as heretofore explained. The fuel need not of necessity be fed from a single nozzle, but may be introduced at several different locations if desired and without great additional expense in view of the simple materials required for this construction.

The usual baffles 410 and arrangement of boiler tubes are provided and the natural action of the stack draft will direct the heat in the desired path. It should be noted however that the sustained turbulence permits of complete burning of the fuel so that only the thoroughly calcined incombustibles are carried around the baffles. This finely divided, relatively light colored substance may accumulate back of the chamber wall below the stack. From time to time such small accumulation of this light fly-ash may be removed from the space 42 beneath the stack, access being provided by a suitable door 43.

As previously indicated the present invention may be adapted to use in domestic furnaces such as hot air furnaces. Figs. 6 and 7 show a simple adaptation of the invention to an existing warm air furnace and also show the limited modification or alteration of structure required. The installation is preferably made below the fire-pot 44 which is mounted according to the manufacturers specification within the casing 45. The usual ashpit wall 46 with its top collar 47 supporting the fire-bowl is left in place but the furnace grate, dumping and shaker mechanisms are removed. Likewise the ashpit door is removed and a simple refractory chamber member 48 is introduced horizontally through the ash door opening. Fire clay or refractory material 49 is used to cover the metal casing floor 50 of the furnace and the cast iron ashpit wall 46. As indicated in Fig. 7 the refractory wall 49 need not cover the entire inside of the wall 46 but may be limited to an area directly opposite the opening 51 of the chamber 48. Chamber 48 has a series of openings 52 arranged somewhat after the fashion shown in the plan view in Fig. 2. As many of the control devices of Fig. 3 as are necessary to produce the desired result may be provided in openings 52. These however are arranged in a vertical plane and a secondary air casing or blast ring 53 of sheet metal or any other suitable material surrounds the opening 52. A pipe 54 supplied from a blower, fan or compressor provides the air jets which sweep about the inner face of the refractory chamber and set up the necessary turbulence. A fuel pipe 55 enters the casing 45 and has its discharge end or nozzle 56 entering the uppermost portion of the refractory chamber at a point advanced or inwardly from the jet openings 52. In this installation, as in the previously explained installations the fuel is introduced with a minimum of carrier air which may be cold or pre-heated. The whole function of this air is to convey the fuel with the least possible amount of agitation to a place where it may enter into and become diffused in the violently turbulent air which has been heated by the absorption of radiant heat. Due to this turbulence and the natural action of the furnace draft, the individual particles are acted upon so as to favor wide diffusion and sustained suspension and movement through a great number of lineal feet in various curved and turning paths. Much of the fuel undergoes early ignition but complete combustion, however rapid requires some appreciable time. Therefore, due to the extended distance of travel in the relatively confined space, none of the fuel particles and none of the residual incombustibles can be impacted against the refractory wall 49. Furthermore the turbulent air is likewise sweeping about all of these surfaces and is taking up radiant heat and thereby increasing the temperature of the air to promote complete combustion of these floating fuel particles. With this embodiment of the invention it is not deemed necessary to provide a special clean-out door for the furnace. The relatively small quantity of fuel used and the nature of the resulting ash favor conditions of very small accumulations. A suction hose, introduced through the usual fire door opening (not shown) will serve to effect occasional clean-out as may be deemed advisable.

It will be understood that in the application of the method and apparatus of this invention to domestic heating furnaces much simplification of structure and a correspondingly reduced cost of installation may be had in domestic furnaces which are initially constructed for carrying out the present invention.

The operation of any of the forms of this invention herein illustrated and such modifications of any of them as may be made by those skilled in the art it is to be understood that the particular means for making or supplying the powdered fuel is not limited to any specific construction. Likewise the source of carrier and secondary air may comprise any one of a number of means suitable for the purpose. It is desirable however that the ratio of fuel supply and secondary air be adjustable to initially attain an optimum condition for practically perfect combustion and that a control be provided to hereafter retain this ratio under all operating ratings.

The combustion with the present apparatus and method is initiated in substantially the same manner employed for other pulverized fuel furnaces, until ignition of the pulverized fuel begins. Thereafter the furnace rapidly attains full operating efficiency, the secondary air entering through the openings serving to absorb a maximum of the radiant heat and thus maintain a temperature in the turbulent air which fosters early ignition and complete combustion of all of the particles of fuel. As heretofore explained adjustments made at the time of installation are the only adjustments necessary, and thereafter the higher and lower heats are obtained as required by increasing or decreasing the supply of fuel and secondary air.

It is to be understood from the foregoing that the invention herein is not restricted to the exact details of construction shown and described since they may be altered in many structural details within the scope of this invention. For example in some cases it may be simpler to secure the desired violent turbulence of air by impinging one or more of the jets of secondary air upon a refractory baffle or obstruction such as 390 (see Fig. 4). The fact that the jets are air alone renders them harmless to surfaces which they strike whereas the usual fuel laden blasts would either burn away or erode the surfaces in a very short time.

What is claimed is:

1. In a pulverized fuel furnace the combination of a chamber having a bottom and side wall structure, means to direct jets of air under pressure at various angles through the wall structure whereby the inner surface of the wall structure is swept by said air jets and impingement of the air from said jets upon the wall structure and upon themselves will create violent agitation of fuel free air for protecting the wall surfaces from the action of radiant heat in the furnace chamber and for heating the turbulent air prior to mixture with pulverized fuel and means to gently feed pulverized fuel into the turbulent preheated air without appreciable contact with the wall surfaces.

2. A pulverized fuel furnace comprising a furnace chamber having openings in the wall thereof, means for introducing jets of air at various angles through the openings whereby a turbulent air zone is created in the chamber and means for introducing pulverized fuel beyond the zone of turbulence, body advance of the turbulent air serving to effect dispersion and mixture of the fuel and air for ignition in said chamber, the turbulent air being heated by some of the radiant heat of combustion and thereby protecting the wall and conditioning the mixture for combustion.

3. In a furnace structure of the class described the combination of a wall forming an ignition chamber, the wall having openings therein at various angles, a pressure air casing adapted to discharge air through said openings to set up a zone of air turbulence in the chamber, means to vary the angle of discharge of the individual openings and powdered fuel feed means adapted for discharge in the path of advance of air from said turbulent zone.

4. In a furnace structure the combination of a chamber wall having openings therein, means for supplying air under suitable pressure to the openings means to vary the discharge of air through the individual openings for setting up a moving volume of turbulent air and means to admit powdered fuel to the turbulent air after it has passed beyond the air supply means.

5. In an ignition chamber for a pulverized fuel furnace the combination of chamber walls having openings therein means to supply air under pressure to said openings, and means whereby the pressure and angle of discharge of the individual openings may be adjusted for producing a violent and sustained air movement in a given cross-sectional zone in the chamber.

RICHARD W. PARRY.